United States Patent
Wheeler et al.

(10) Patent No.: US 10,796,682 B2
(45) Date of Patent: Oct. 6, 2020

(54) QUIET ZONE FOR HANDSFREE MICROPHONE

(71) Applicant: FORD GLOBAL TECHNOLOGIES, LLC, Dearborn, MI (US)

(72) Inventors: Joshua R. Wheeler, Trenton, MI (US); Scott A. Amman, Milford, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 235 days.

(21) Appl. No.: 15/646,412

(22) Filed: Jul. 11, 2017

(65) Prior Publication Data
US 2019/0019494 A1 Jan. 17, 2019

(51) Int. Cl.
| | |
|---|---|
| *G10K 11/178* | (2006.01) |
| *H04R 1/02* | (2006.01) |
| *G10L 15/22* | (2006.01) |
| *H04R 1/32* | (2006.01) |
| *B60H 1/00* | (2006.01) |
| *H04R 3/00* | (2006.01) |
| *G10L 15/00* | (2013.01) |

(52) U.S. Cl.
CPC ....... *G10K 11/178* (2013.01); *B60H 1/00757* (2013.01); *G10K 11/17881* (2018.01); *G10K 11/17883* (2018.01); *G10L 15/00* (2013.01); *G10L 15/22* (2013.01); *H04R 1/025* (2013.01); *H04R 1/326* (2013.01); *H04R 3/005* (2013.01); *B60H 2001/006* (2013.01); *G10K 2210/1282* (2013.01); *G10K 2210/12821* (2013.01); *G10K 2210/3044* (2013.01); *G10K 2210/3046* (2013.01); *G10K 2210/501* (2013.01); *G10L 2015/223* (2013.01); *H04R 2410/05* (2013.01); *H04R 2420/07* (2013.01); *H04R 2499/13* (2013.01)

(58) Field of Classification Search
CPC ......... G10K 2210/1282; G10K 11/175; G10K 2210/3217; G10L 21/0208; G01M 13/028
USPC ................................ 381/86, 71.1, 71.2, 71.4
See application file for complete search history.

(56) References Cited

U.S. PATENT DOCUMENTS

| | | | |
|---|---|---|---|
| 7,769,187 B1 * | 8/2010 | Farrar | H04R 1/1041 381/384 |
| 9,020,158 B2 | 4/2015 | Wertz et al. | |
| 9,595,251 B2 | 3/2017 | Whinnery | |

(Continued)

OTHER PUBLICATIONS

Avid Sedgwick, Sweet Sounds of Silence, Suppliers' improvement to noise cancellation may help voice recognition systems work better, Automotive News, Nov. 18, 2013 pp. 1-2.

*Primary Examiner* — George C Monikang
(74) *Attorney, Agent, or Firm* — Frank L. Lollo; MacMillan, Sobanski & Todd, LLC

(57) ABSTRACT

A handsfree voice system has a microphone mounted in a fixed location in a passenger cabin. An audio signal from the microphone can be used by a voice recognition system to detect spoken commands of a driver or can be used by a cellular telephone transceiver to transmit sounds for a spoken conversation over a phone call. A pair of speakers is mounted at a periphery of the microphone. A plurality of noise sensors are configured to characterize intrusive noises into the cabin. An active noise cancellation controller is responsive to the noise sensors for generating anti-noise to be output by the speakers establishing a quiet zone centered on the microphone.

18 Claims, 3 Drawing Sheets

(56) References Cited

U.S. PATENT DOCUMENTS

| | | | |
|---|---|---|---|
| 2002/0031234 A1* | 3/2002 | Wenger | H04R 1/406 |
| | | | 381/86 |
| 2009/0214055 A1* | 8/2009 | Sawashi | H04R 3/007 |
| | | | 381/94.1 |
| 2010/0124337 A1* | 5/2010 | Wertz | G10K 11/1786 |
| | | | 381/71.11 |
| 2010/0329488 A1 | 12/2010 | Holub | |
| 2013/0185066 A1* | 7/2013 | Tzirkel-Hancock | ........................ |
| | | | G10L 21/057 |
| | | | 704/233 |
| 2014/0094228 A1 | 4/2014 | Hamelink et al. | |
| 2014/0270241 A1* | 9/2014 | Yu | G10L 21/0208 |
| | | | 381/86 |
| 2015/0170633 A1* | 6/2015 | Nakagawa | G10K 11/175 |
| | | | 381/71.6 |
| 2015/0176989 A1* | 6/2015 | Welch | G01C 9/02 |
| | | | 702/141 |
| 2016/0375787 A1* | 12/2016 | Liu | B60K 35/00 |
| | | | 701/22 |
| 2017/0032806 A1 | 2/2017 | Konjeti et al. | |
| 2017/0053640 A1 | 2/2017 | Kwan | |

\* cited by examiner

QUIET ZONE FOR HANDSFREE MICROPHONE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to obtaining high signal-to-noise performance of detecting spoken voice with a microphone in a noisy environment, and, more specifically, to active noise cancellation creating a "quiet zone" around a handsfree microphone in an automotive vehicle.

Automatic Speech Recognition (ASR) and HandsFree Calling (HFC) capabilities have become popular features in automotive vehicles. Customer satisfaction with ASR systems continues to be a challenge, often because vehicle noise entering the passenger cabin overwhelms the driver's voice when they try to issue commands. Automakers have tried to improve the signal-to-noise ratio (SNR) by positioning the handsfree microphone close to the driver and limiting the intrusive environmental noise in the cabin.

Cabin noises have also been addressed using Active Noise Cancellation (ANC) systems which inject anti-noise from cabin speakers which is the inverse of the noise so that much of the noise is cancelled. Because of the complexity of the sound field in the passenger cabin and the difficulty and/or expense involved in generating the required anti-noise over such a large volume of space, ANC systems have been limited to either cancelling noises only in a small volume around an occupant's head or cancelling only lower frequency noises.

ANC works by measuring an acoustic signal and then performing delay and phase inversion calculations for a speaker(s) to output a cancelling signal, so that both signals reach the occupant's ear at the same time. In order to successfully cancel a noise, the distance from the speaker(s) to the occupant's ear must generally be no greater than the wavelength of the frequency that the ANC system attempts to cancel. The most common ANC systems in conventional vehicles focus on cancelling very low frequency noises like those from engine idle or body "boom" noises because the corresponding low frequency wavelengths are long enough that the cancelling tone can be sent from existing door mounted speakers to create a large "low-frequency quiet zone" encompassing the driver's head position. In order to provide a greater frequency range for ANC, a speaker placement closer to an occupant's head has also been used, e.g., speakers placed in a headrest.

In regard to the performance of ASR and HFC systems, it has been recognized that full cabin ANC can be beneficial for improving SNR as well as recognition accuracy for spoken commands. However, the relevant audio frequency range for human speech extends above the capabilities of full cabin ANC systems. Therefore, the improvements have been limited, and noise continues to present a problem.

In characterizing an acoustic noise signal to be cancelled, known ANC systems have used various sensors including microphones inside and outside the passenger cabin. A cancelling signal has also been derived from controlled variables within the vehicle, such as engine speed commands. In order to cancel only intrusive noises, the noise sensing should exclude any intended sounds within the cabin. In the case of an audio system media player (e.g., CD player or radio), for example, it is known to filter out the audio output from the sounds to be cancelled. It is not possible to filter out the spoken commands uttered by a driver from the signal from a cabin microphone since that would defeat the purpose of the microphone. Therefore, it is more difficult to extend the range of noise cancellation based on a cabin microphone.

SUMMARY OF THE INVENTION

The present invention improves broadband noise levels at the handsfree microphone in the vehicle using small footprint, full range speakers that flank the handsfree microphone. Transducers are placed in the vehicle at noise producing locations to determine what audio noises need to be cancelled in a "quiet zone" at the microphone to ensure that the driver's commands are clearly understood.

In one aspect of the invention, a handsfree voice system, comprises a microphone mounted in a fixed location in a passenger cabin. A pair of speakers is mounted at a periphery of the microphone. A plurality of noise sensors are configured to characterize intrusive noises into the cabin. An active noise cancellation controller is responsive to the noise sensors for generating anti-noise to be output by the speakers establishing a quiet zone centered on the microphone.

DETAILED DESCRIPTION OF PREFERRED EMBODIMENTS

Figure 1:
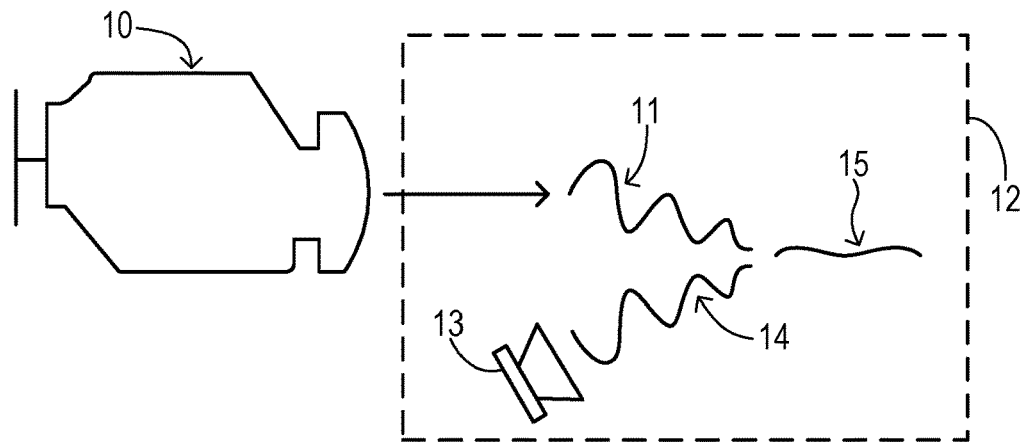
FIG. 1 is a diagram showing the addition of anti-noise to quiet a noise signal.

FIG. 1 provides a graphical representation of the operation of an active noise cancellation (ANC) system. A noise source such as an internal combustion engine 10 creates an undesired acoustic noise 11 that propagates into a passenger cabin 12 of a vehicle. Other sources of intrusive noises include, without limitation, an HVAC blower, a vehicle suspension system, and vehicle body panels such as the roof, doors, and trunk lid. In the present invention, it may also be desirable to cancel deliberately introduced acoustic sounds such as the output of an audio system/media player or other electronically generated sounds that can be easily characterized for cancelling. Located within cabin 12 is a speaker system 13 which act as an anti-noise (i.e., cancellation) source which generates an anti-noise sound wave 14 which arrives at a common location within cabin 12 so that acoustic waves 11 and 13 combine, resulting in a reduced sound wave 15.

Figure 2:
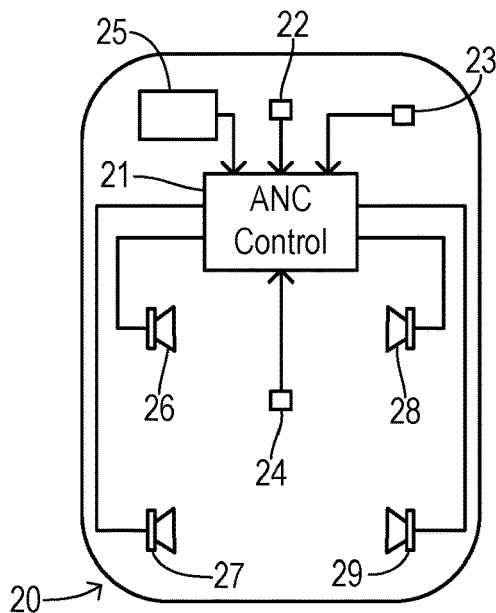
FIG. 2 is a schematic, block diagram showing a conventional ANC system in a vehicle.

FIG. 2 shows a vehicle 20 having a conventional ANC system wherein an ANC controller 21 receives noise signals from a plurality of noise sensors including an engine noise sensor (e.g., microphone) 22, a suspension noise microphone 23, and a cabin noise microphone 24. As known in the art, engine noise can instead be estimated based on engine control parameters from an engine control module 25. Since the control parameters (e.g., ignition timing signals) can be correlated to engine noises that intrude into the passenger cabin, they can be used to generate an anti-noise signal to cancel the intrusive noise. Using known techniques, ANC controller 21 generates noise cancelling signals which are provided to output speakers 26-29, which may be the existing speakers for an audio entertainment system, for example.

As mentioned above, the ANC system of FIG. 2 is typically limited to cancelling low frequency noises because the corresponding wavelengths are long enough that the cancelling tone can be sent from existing door mounted speakers. In order to also cancel higher frequencies, it is known to place speakers in a headrest such as shown in U.S. Pat. No. 9,431,001. When targeting noise cancellation for a driver's head only, however, the ambient noise elsewhere within the cabin remains unchecked.

Figure 3:
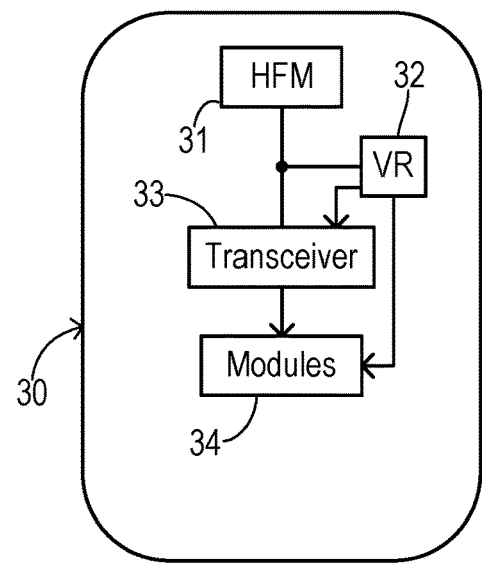
FIG. 3 is a schematic, block diagram showing a conventional voice recognition/handsfree voice system in a vehicle.

FIG. 3 shows a vehicle 30 having a conventional voice recognition (VR) control system and a handsfree cellular telephone system. A handsfree microphone (HFM) 31 picks up an occupant's (e.g., driver's) spoken voice signals and provides them to a VR module 32 and a wireless transceiver module 33. VR module 32 uses well known methods to convert spoken commands into electrical commands which are transmitted to various modules 34 and to transceiver module 33 for initiating various control actions. The effectiveness/accuracy of VR module 32 may be negatively impacted by acoustic noises impinging on HFM 31. Known ANC systems have only marginally improved VR performance due to the continued presence of noises across the frequency spectrum of the spoken voice (e.g., about 200 Hz to about 3 kHz).

Figure 4:
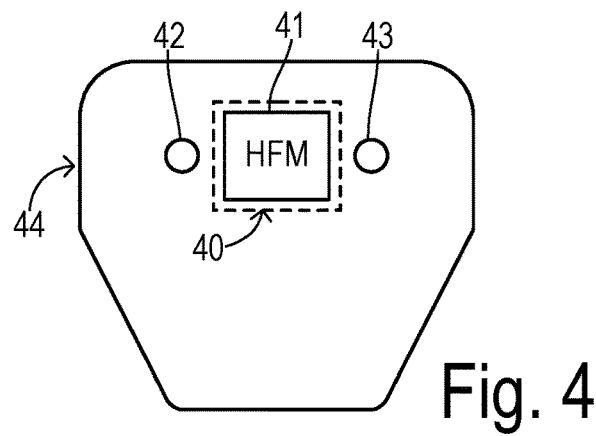
FIG. 4 is a plan view of an overhead console with a handsfree microphone and ANC speakers.

FIG. 4 shows a first embodiment of the invention which creates a "quiet zone" 40 centered at the location of an HFM 41. Two small footprint, full range speakers 42 and 43 are mounted at the periphery of HFM 41 which is mounted in a fixed location within the passenger cabin. In a preferred embodiment, speakers 42 and 43 are mounted on opposite sides of HFM 41. By mounting speakers 42 and 43 in close proximity to HFM 41, quiet zone 40 has a broader frequency range of ANC capability than the conventional systems using the door mounted speakers that are farther from the point of interest. HFM 41 and speakers 42 and 43 may preferably be part of a single common assembly such as an overhead console 44 installed in a vehicle headliner (not shown). The common assembly (e.g., console) may be generally flat so that speakers 42 and 43 are approximately coplanar with HFM 41. HFN 41 may be a unidirectional (e.g., cardioid) handsfree microphone. In order to effectively cancel noises within a voice frequency range of about 200 Hz to about 3 kHz, the center of each speaker 42 and 43 is preferably mounted within about 4 inches or less from the center of HFM 41. More preferably, noise cancellation may be extended up to about 7 kHz (e.g., as contained in wideband Bluetooth specifications), and the corresponding wavelength would require the speakers to be placed within about 2 inches from the microphone. The close proximity of speakers 42 and 43 to HFM 41 also means that the radiated amplitude of the anti-noise signals needed to achieve effective cancellation can be kept sufficiently low to minimize audibility of the anti-noise signals by the occupants.

Figure 5:
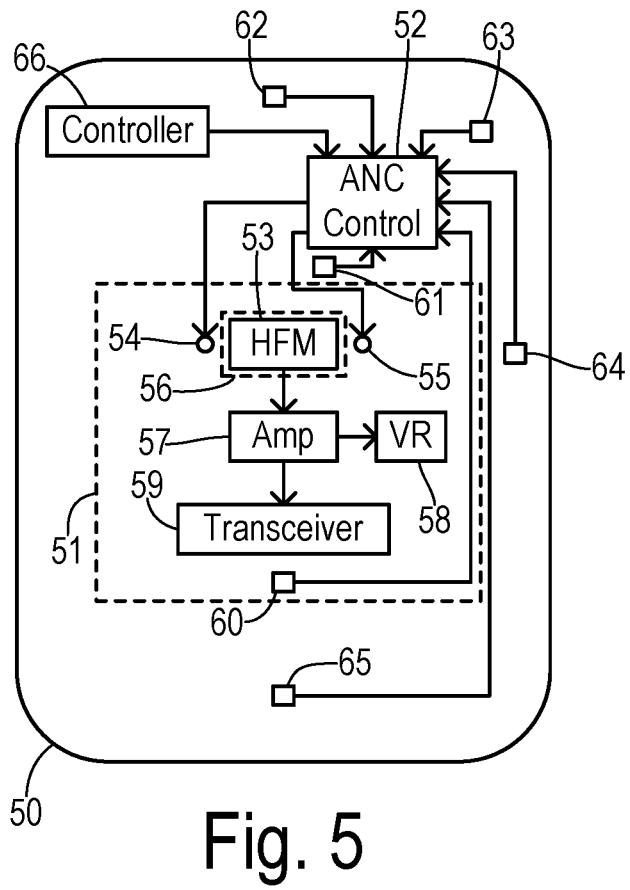
FIG. 5 is a block diagram showing one preferred embodiment of the invention.

FIG. 5 shows a vehicle 50 employing an active noise control system according to one embodiment of the invention. A passenger cabin 51 provides an interior environment for a driver and passengers which is subject to intrusive noises that can interfere with operation of Voice Recognition systems and HandsFree Calling systems. To provide a quiet zone 56 around a handsfree microphone (HFM) 53, an active noise cancellation (ANC) controller 52 drives noise cancelling speakers 54 and 55 disposed at the periphery of HFM 53. An electrical output of HFM 53 is connected to an amplifier 57 which provides a conditioned voice signal to a VR controller 58 and a wireless transceiver 59. Transceiver 59 can be a vehicle mounted cellular telephone transceiver or can be a Bluetooth node for communicating with a portable smart phone, for example.

In order to characterize the noises to be cancelled, a plurality of noise sensors (e.g., accelerometers or microphones) are placed in areas known to radiate noise inside the cabin that will compete with the driver's speech to classify and quantify these signals. A microphone can be used to directly sense the acoustic vibrations in air, while an accelerometer can be mounted to a vehicle structure which is subject to mechanical vibrations that contribute to the intrusive noises. Preferably, each accelerometer has a mounting surface which is adhered to a surface of the vibrating vehicle structure so that a sensing axis of the accelerometer is perpendicular to the surface of the vehicle structure. Among the locations for sensing the noises/vibrations are a roof sensor 60 mounted to a roof panel, an HVAC sensor 61 mounted to an HVAC air handling passage (e.g., an HVAC case or duct) fluidically coupled to passenger cabin 51, an engine sensor 62 mounted in an engine compartment, a suspension sensor 63 mounted to a suspension structure such as a strut, a door sensor 64 mounted to a door panel, and a trunk sensor 65 mounted to a trunk lid or liftgate. Other potential locations for placing an accelerometer/microphone include a floor pan and vehicle windows. Instead of sensing engine sounds or vibrations, ANC controller 52 can alternatively be connected to an engine controller 66 which provides engine control parameters as the basis for determining appropriate anti-noise signals.

As known in the art, ANC controller 52 includes transfer functions (e.g., determined according to the impulse responses acquired between the noise-sensing transducers and the HFM) so the necessary delay and convolution parameters are determined for the speakers near the microphone to cancel the undesired noises. Controller 52 or another controller/amplifier such as an audio control module adds the various cancelling signals and powers speakers 54 and 55 so that when the undesired noise arrives from the sources, the cancellation signal from speakers 54 and 55 reduces the impact before it hits HFM 53.

Figure 6:
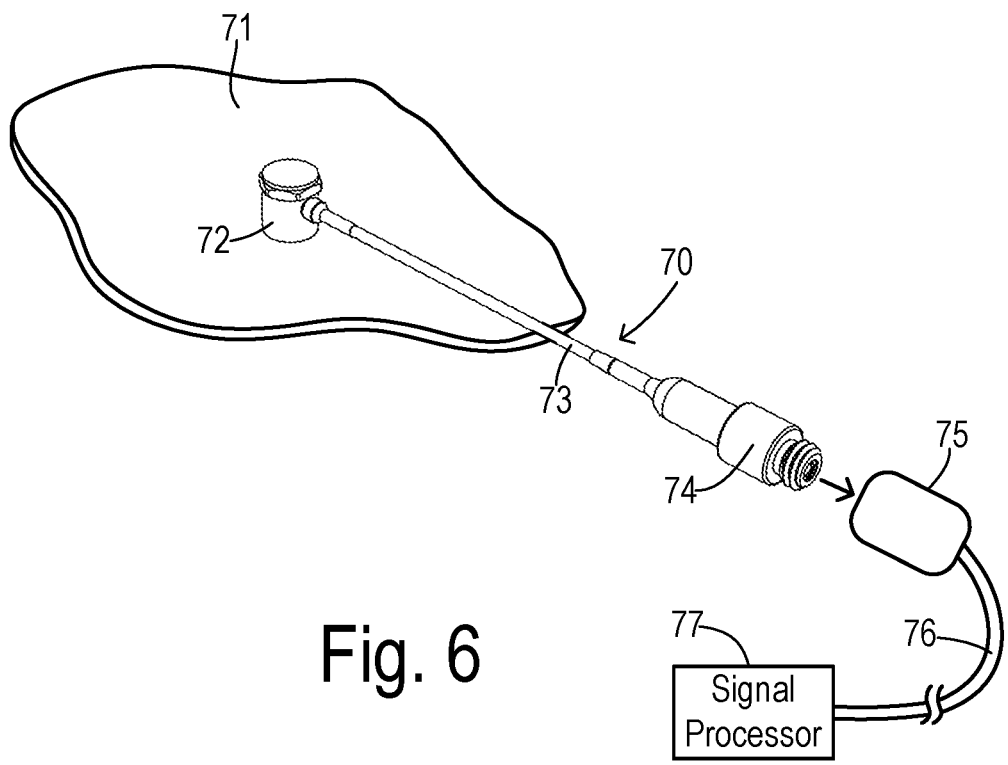
FIG. 6 is a perspective view of an accelerometer mounted to a vibrating panel as used in one embodiment of the invention.
Figure 7:
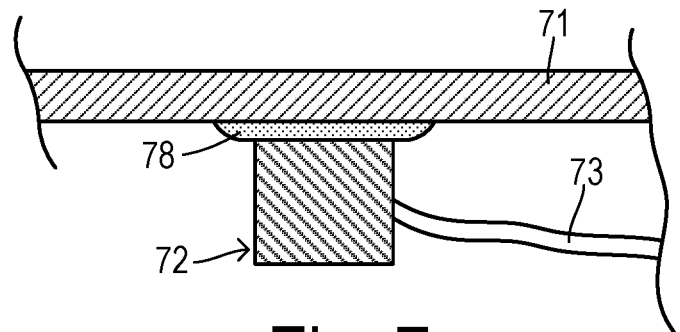
FIG. 7 is a cross-sectional view of a mounting of the accelerometer of FIG. 6.

FIG. 6 shows an accelerometer assembly 70 for mounting to a vehicle structure (e.g., body panel) 71. An accelerometer sensor unit 72 is coupled by a coaxial cable 73 to a connector plug (e.g., a BNC plug) 74. Sensor unit 72 is rigidly attached to structure 71 in an orientation wherein the sensing axis of accelerometer sensor unit 72 is perpendicular to the surface of vehicle structure 71. A vehicle-mounted socket 75 receives plug 74 and has a transmission cable 76 that connects to a signal processor 77. As shown in greater detail in FIG. 7, an adhesive layer 78 attaches sensor unit 72 to vehicle structure 71.

Figure 8:
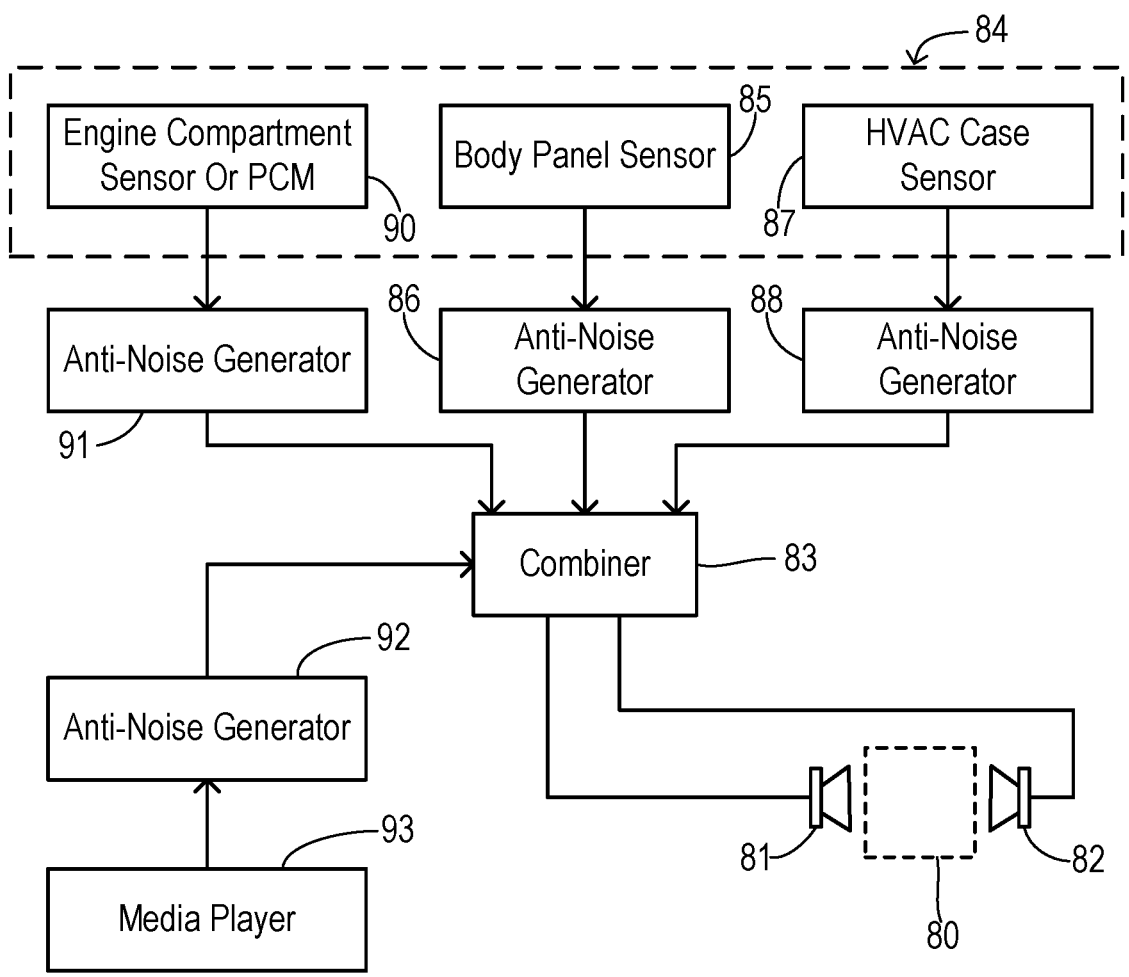
FIG. 8 is a block diagram of another preferred system of the invention.

FIG. 8 shows another depiction of the invention wherein a quiet zone 80 is established between speakers 81 and 82. Quiet zone is adapted for receiving a handsfree microphone (not shown) for transducing spoken vocalizations into electrical signals for handsfree calling and/or voice recognition. Speakers 81 and 82 are driven by a combiner 83 which receives anti-noise signals from various sources which separately compensation for respective sources of intrusive/undesired noises. A plurality of noise sensors 84 include a body panel sensor (e.g., accelerometer) 85, an HVAC sensor (e.g., accelerometer or microphone) 87, and an engine sensor (e.g., accelerometer or engine controller) 90. Sensors 85, 87, and 90 are connected to anti-noise generators 86, 88, and 91, respectively, which have their outputs connected to combiner 83. In order to reduce the impact of deliberately generated noises from an audio entertainment system of media player, the audio output from a media player 93 is coupled through an anti-noise generator 92 to another input of combiner 83. Consequently, the combined anti-noise signals represent only known or measured noises impinging on the microphone (i.e., do not contain the sounds spoken by the driver/occupants), so that the spoken sounds are obtained with minimal contamination by the noises.

What is claimed is:

1. A handsfree voice system, comprising:
a microphone mounted in a passenger cabin;
a pair of speakers each peripherally mounted within 4 inches of the microphone;
a noise sensor outside the cabin configured to characterize intrusive noises into the cabin; and
an active noise cancellation controller responsive to the noise sensor for generating anti-noise in a range from 200 Hz to 3 kHz output by the speakers establishing a quiet zone only within the periphery centered on the microphone and not including any occupant of the cabin.

2. The system of claim 1 wherein the speakers are coplanar with the microphone.

3. The system of claim 1 wherein the microphone is unidirectional.

4. The system of claim 1 wherein the fixed location is on an overhead console.

5. The system of claim 1 wherein the noise sensor is comprised of an accelerometer mounted to a vehicle structure outside the passenger cabin subject to vibrations that contribute to the intrusive noises.

6. The system of claim 5 wherein the accelerometer has a mounting surface adhered to a surface of the vehicle structure so that a sensing axis of the accelerometer is perpendicular to the surface of the vehicle structure.

7. The system of claim 6 wherein the surface of the vehicle structure carries vibrations associated with an engine of the vehicle.

8. The system of claim 6 wherein the surface of the vehicle structure is comprised of a body panel of the vehicle.

9. The system of claim 6 wherein the surface of the vehicle structure is comprised of an HVAC air handling passage fluidically coupled to the passenger cabin.

10. The system of claim 1 wherein the noise sensor comprises an electronic controller that controls operation of a vehicle function outside the cabin in a manner that correlates to corresponding intrusive noises.

11. A voice recognition control system in a vehicle, comprising:
a microphone mounted in a fixed location in a passenger cabin;
a pair of speakers each peripherally mounted within 4 inches of the microphone;
a noise sensor outside the cabin configured to characterize intrusive noises into the cabin; and
an active noise cancellation controller responsive to the noise sensor for generating anti-noise in a range from 200 Hz to 3 kHz output by the speakers establishing a quiet zone only within the periphery and centered on the microphone and not including any occupant of the cabin; and
a voice recognizer coupled to the microphone to process an audio signal generated by the microphone to detect commands spoken by a user within the passenger cabin.

12. The system of claim 11 further comprising:
a wireless communication unit coupled to the microphone to process the audio signal to wirelessly transmit a conversation spoken by the user.

13. The system of claim 11 wherein the speakers are coplanar with the microphone.

14. The system of claim 11 wherein the microphone is unidirectional.

15. The system of claim 11 wherein the fixed location is on an overhead console.

16. The system of claim 11 wherein the noise sensor is comprised of an accelerometer mounted to a vehicle structure outside the passenger cabin subject to vibrations that contribute to the intrusive noises.

17. The system of claim 16 wherein the accelerometer has a mounting surface adhered to a surface of the vehicle structure so that a sensing axis of the accelerometer is perpendicular to the surface of the vehicle structure.

18. The system of claim 17 wherein the surface of the vehicle structure is comprised of a body panel of the vehicle.

* * * * *